United States Patent
Rogers et al.

(10) Patent No.: US 6,466,004 B1
(45) Date of Patent: Oct. 15, 2002

(54) APPARATUS AND METHOD FOR MEASURING WELD CIRCUIT

(75) Inventors: Peter F. Rogers, Worthington, OH (US); Ronald J. Gaines, Dublin, OH (US)

(73) Assignee: Sensotec, Inc., Columbus, OH (US)

( * ) Notice: Subject to any disclaimer, the term of this patent is extended or adjusted under 35 U.S.C. 154(b) by 0 days.

(21) Appl. No.: 09/560,007

(22) Filed: Apr. 27, 2000

(51) Int. Cl.⁷ .................. G01R 33/00; G01R 33/02; B23K 11/24; B23K 11/30
(52) U.S. Cl. .............. 324/117 H; 324/252; 219/109; 219/120
(58) Field of Search .............. 324/117 H, 127, 324/126, 252, 117 R, 144, 207.11, 207.2, 260; 219/109, 110, 118, 123, 130.01, 130.33, 120

(56) References Cited

U.S. PATENT DOCUMENTS

| | | | |
|---|---|---|---|
| 3,843,923 A | 10/1974 | deVries et al. | |
| 4,147,919 A | * 4/1979 | Matasovic | ................. 219/132 |
| 4,464,629 A | 8/1984 | Tanaka et al. | |
| 4,472,620 A | * 9/1984 | Neid | .......................... 219/109 |
| 4,625,166 A | 11/1986 | Steingroever et al. | |
| 4,721,840 A | * 1/1988 | Fielding | ................. 324/117 H |
| 4,737,710 A | 4/1988 | Van Antwerp et al. | |
| 4,825,157 A | 4/1989 | Mikan | |
| 4,857,842 A | 8/1989 | Sturman et al. | |
| 5,218,298 A | 6/1993 | Vig | |
| 5,406,202 A | 4/1995 | Mehrgardt et al. | |
| 5,504,299 A | 4/1996 | Heckendorn | |
| 5,640,090 A | 6/1997 | Furuya et al. | |
| 5,825,175 A | * 10/1998 | Selcuk | ................... 324/117 H |
| 5,850,142 A | 12/1998 | Rountos et al. | |
| 5,872,408 A | * 2/1999 | Rakov | ........................ 324/667 |

* cited by examiner

*Primary Examiner*—Michael Sherry
*Assistant Examiner*—Jermele Hollington
(74) *Attorney, Agent, or Firm*—Mueller and Smith, LPA (57) ABSTRACT

Apparatus and method for measuring weld current utilizing Hall effect sensors. The apparatus is immune from the position sensitivity drawbacks of Hall effect sensor based current memory devices through the utilization of a radially symmetrically disposed orientation of the Hall effect sensor in combination with the utilization of a summing network responsive to the output of each such sensor.

31 Claims, 9 Drawing Sheets

APPARATUS AND METHOD FOR MEASURING WELD CIRCUIT

BACKGROUND OF THE INVENTION

Welding is a metal-joining process wherein coalescence is produced by heating to suitable temperatures with or without the application of pressure, and with or without the use of filler metal (American Welding Society definition). Of the welding technology disciplines, a variety of welding techniques involve the generation of very high currents which are maneuvered along current path regions of altering direction. Each of these path regions, in turn, develop an electromagnetic field having directional aspects which correspond with that region. Thus, the variously derived fields, as well as any stray fields, will mutually intersect in one way or another. The more predominate of the welding procedures involving such high current paths is generally referred to as resistance welding. Resistance welding refers to a group of welding processes that produces coalescence at faying surfaces with heat obtained from the resistance of the workpiece to the flow of the welding current in a circuit of which the workpiece is a part, and by the application of pressure. Several welding categories are classified as resistance welding. The more prevalent of these categories are resistance spot welding (RSW), resistance projection welding (RPVW), and resistance seam welding (RSEW). In resistance spot welding, the coalescence at the faying surfaces is produced in one spot or nugget by the heat obtained from resistance to electric current passing through the workpieces held together under pressure by electrodes. Variations in the RSW process differ in the application of welding currents and pressure, as well as in the arrangement of the current directing circuit (secondary domain). In the latter regard, direct and indirect welding as well as parallel and series welding have been employed. Projection welding is similar to spot welding wherein coalescence is produced by the heat obtained from resistance to electric current through the workpieces held together under pressure by electrodes. The resulting welds are localized at predetermined points by projections, embossments or intersections. In resistance seam welding, leak-tight welds can be made by a series of overlapping spot welds. These are produced by introducing time, coordinated, pulses of current from rotating wheel electrodes. Roll resistance spot welding (RRSW) is similar to seam welding, being carried out with one or more rotating circular electrodes. In resistance upset welding (RUW) coalescence is produced simultaneously over the entire area of abutting surfaces or progressively along a joint of the workpieces by heat obtained from resistance to electric current through the area of contact of the surfaces. Resistance flash welding (RFW) involves a procedure wherein coalescence is produced simultaneously over the entire area of abutting surfaces of workpieces by the heat obtained from resistance to electric current between the two surfaces and by the application of pressure after heating is substantially completed. RUW and RFW are accompanied by expulsion of metal from the resultant joint. Resistance percussion welding (RPW) achieves coalescence simultaneously over the entire abutting surfaces of workpieces by the heat obtained from an arc produced by a rapid discharge of electrical energy with pressure percussively applied during or immediately following the electrical discharge.

The main process variables involved in resistance welding are welding current, welding time, electrode force, and electrode material and design. In the majority of cases, the current during resistance welding is in the range from about 5,000 to 50,000 amperes. Because of the high values of current, resistance welding machines are designed as low-voltage sources, usually in the range from about 1 to 25 volts. These low voltages are obtained typically from a step-down transformer which usually has a single-or two-turn, cast-copper, water cooled secondary winding. Power supply to the primary windings of the transformer usually is obtained from public utilities single-phase alternating-current sources. The step-down ratio of the transformer typically is approximately 100; thus the current requirements of the primary winding are lowered to reasonable values, which generally range from 50 to 500 amperes.

Alternating current of 60 Hz is used in most resistance welding installations, although, three phase frequency converters are used to supply 2.5- to 25-Hz voltage to single-phase transformers. Welding current also may be supplied by a direct-current or stored-energy source. Direct current may be obtained from various low-voltage sources, such as rectifiers, homopolar generators, or storage batteries. The energy may be stored during relatively long periods and released suddenly from capacitors, magnetic fields, storage batteries or heavy flywheels on homopolar generators. These types of power supplies eliminate large transient loads on power lines.

The duration of welding times in resistance welding installations is short, generally being in the range of from one half cycle ($120^{th}$ of a second) to a few seconds. In the majority of applications, the time is in the range of 5 to 120 cycles of the 60 Hz source ($\frac{1}{12}$ to 2 seconds).

Weld testing predominately is carried out with procedures involving the destruction of the workpieces. Statistically significant numbers of these workpieces are subjected to such testing. In general, the strength of a single spot weld in shear is determined by the cross-sectional area of the nugget in the plane of the faying surfaces. Strength test for spot welds are discussed in Chapter 12, Volume 1 of the Eighth Edition of the *Welding Handbook*, American Welding Society, Miami, Fla. 33135. Additional information concerning spot weld test procedures is provided, for example, by the American Welding Society, See: AWS C1.1, *Recommended Practices for Resistance Welding*.

Notwithstanding these published procedures, in a great many instances, generally, the procedures for testing are generated at the plant level and will involve the destruction of a given number or percentage of welded parts produced or submitted by smaller suppliers. The test failure of one weld may lead to consideration of rejecting an entire batch of product which may involve the rejection of thousands of items. In effect, industries currently typically are striving to achieve total quality in welded parts, i.e., a 100% acceptance quality.

An endeavor to achieve this quality weld-based production necessarily involves the evaluation of the above-noted weld process parameters. Such evaluation with respect to weld current preferably will not invade the weld circuit path, but will remain quite accurate. Weld current sensing systems may be permanently implanted in the welding process, but also should provide for portability as may be employed in spot checking and set-up calibration procedures for welding systems. The operational parameter of weld current can represent an important factor in evaluating critical components of the weld system, such as electrode shapes. Particularly where large numbers of welds are involved, as witnessed in robotically maneuvered weld machines, electrode shapes may degenerate, resulting not only in unsatisfactory welds, but also may be manifested by the phenomena of electrodes sticking to the workpiece. The latter condition may result in substantial disruption of a production line.

At the present time, weld currents principally are measured utilizing a device referred to as a "Rogowski" coil, a torus wound coil which is positioned around a current carrier of the welding device. Because of their sensitivity to motion, installation of the coils within a weld machine requires adequate strapping or mounting and the like to avoid relative movement between the current carrier and the measuring coil. The output of the coil represents a differential of current, di/dt, which must be further treated by an integrator network to achieve a value for current. These rather inconvenient and bulksome devices additionally are limited to the measurement of alternating or pulsating weld current, not being responsive to d.c. welding systems. A weld current monitor employing a single Hall device has been described in Heckendorn, U.S. Pat. No. 5,504,299 entitled "Resistance Welding Sensor", issued Apr. 2, 1996. This device, however, is highly sensitive to any alteration of its orientation with respect to the weld current path. Thus, any reconfiguration of the sensor device adjacent to that path results in a requirement for recalibration. Of course, such devices are unavailable for use as portable or hand-held weld current measurement instruments.

BRIEF SUMMARY OF THE INVENTION

The present invention is addressed to apparatus and method for measuring high level weld currents, particularly as are encountered in the field of resistance welding. The apparatus employs Hall effect sensors with the attendant advantage of off-current path positioning, but without the otherwise present problem of position sensitivity. As a consequence, the apparatus and method enjoy the added advantage of being utilized in quite broadened measurement applications, including an incorporation of the Hall effect based networks into portable, including hand-held, instruments.

Position sensitivity essentially is eliminated through the use of at least two Hall effect sensors which are symmetrically disposed about the center location of the apparatus housing. In particular, the sensors are located within a peripheral region of the housing surrounding at least a portion of the center location. By so symmetrically mounting the sensors, their reaction to the interfering flux patterns of adjacent extraneous electromagnetic fields is accommodated for by output signal cancellation. A consistent and reliable measuring output signal corresponding with the current sought to be measured is developed by a simple summing procedure, implemented, for example, by an instrument-borne summing amplifier network. The resultant signal may be treated in a variety of ways including digitization and subsequent mathematical treatment by a process controller. However, the measuring output signal always will be linearly related to the current value sought to be measured.

In one embodiment of the invention, two Hall effect sensors are mounted at the peripheral region of the housing which are mutually oppositely disposed along a common diameter passing through the center location of the housing. In general, that center location of the housing is aligned with the center of the current path of interest.

In another embodiment, three of the Hall effect sensors are mounted at the housing peripheral region. Each of these Hall effect sensors is positioned at one of three radii extending from the center location of the housing. The radii are mutually angularly oriented at 120° radial spacing.

Where four Hall effect sensors are utilized at the housing peripheral region, each is positioned at one of four radii extending from the housing center location and mutually angularly oriented at 90° radial spacing.

Because of the very high current values employed in resistance welding and the resultant rather strong electromagnetic fields involved with various directional orientation aspects, the gain characteristics of the Hall effect devices may be adjusted to avoid saturation phenomenon not only by programming lower gains within the Hall components themselves, but also by angularly orienting their flux confronting faces in an off-radius manner to diminish the confronting face area available for confrontation with electromagnetic flux. The result is a reduction or attenuation of gain by a selected amount.

Other objects of the invention will, in part, be obvious and will, in part, appear hereinafter. The invention, accordingly comprises the apparatus and method possessing the construction, combination of elements, arrangement of parts, and steps which are exemplified in the following description.

For a fuller understanding of the nature and objects of the invention, reference should be had to the following detailed description taken in connection with the accompanying drawings.

DETAILED DESCRIPTION OF THE INVENTION

In the discourse to follow, the weld current measuring apparatus of the invention is described in connection with a pedestal mounted resistance spot welder. As will be apparent, the apparatus has application to a broad range of welding machine configurations wherein current flow paths change to evoke correspondingly intersecting electromagnetic fields.

Figure 1:
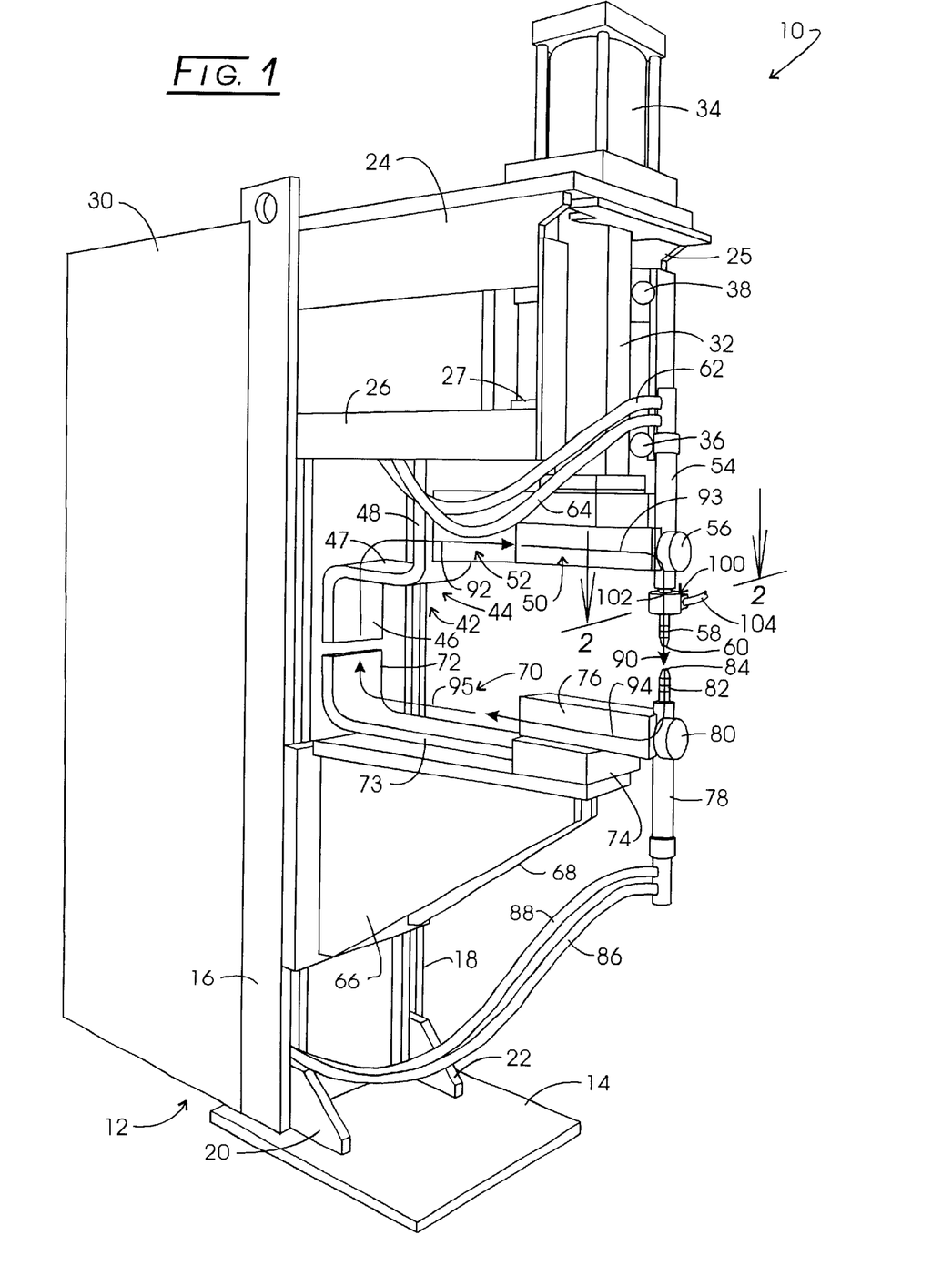
FIG. 1 is a perspective view of a resistance spot welding machine incorporating one embodiment of the invention.

Referring to FIG. 1, a resistance welding system of a spot weld variety is represented generally at 10. System 10 is configured with a generally U-shaped frame 12 including a steel base 14, upstanding back frame members 16 and 18 reinforced, respectively by feet 20 and 22, and forwardly extending top frame members 24–27. A rear housing is provided at 30 within which is mounted a somewhat robust step-down transformer (not shown) which generates very high currents at very low voltages.

Top frame members 24–27 support a weld head which performs in conjunction with a pneumatic actuator including a pneumatic cylinder 34. An upper electrode holder or support is shown at 54 which is coupled to an upper current carrier assembly represented generally at 42. Carrying input current from one end of the secondary side of the system transformer, assembly 42 includes a current shunt represented generally at 44 having current path regions 46–48 of altering direction which in turn, extend into current carrying communication with an upper horn assembly represented generally at 50 and including a transition component represented generally at 52. The electrically conductive upper horn assembly 50 is attached and in electrical communication with an electrically conductive upper electrode holder or support 54 which, in turn, is secured to the assembly 50 by a horn end cap 56. The electrode holder 54 supports an input electrode 58 having an upper contact surface 60. Electrode holder 54 and electrode 58 are cooled with circulating water provided by flexible conduits 62 and 64.

Back frame members 16 and 18 also support respective lower frame members 66 and 68. Members 66 and 68, in turn, support an electrically conductive lower current shunt represented generally at 70. Shunt 70 is coupled to the opposite end of the secondary winding of the welding transformer and is seen to include, for example, directionally altering current path regions 72 and 73. Having robust dimensions suited for carrying the large amount of current involved, the electrically conductive regions 72 and 73 extend to an electrically conductive platen 74 upon which is mounted a lower horn 76. Lower horn 76 supports a lower electrode holder or support 78, attachment being provided at a lower horn end cap 80. Electrode holder 78 supports a stationary lower electrode 82 which extends to a lower electrode contact surface 84. Electrode holder 78 and associated electrode 82 are cooled by circulating water as supplied from flexible conduits 86 and 88.

The welding system 10 is shown in a pre-weld or open orientation wherein a gap as at 90 is present between the confronting electrode contact surfaces 60 and 84. In operation, a pair of workpieces is inserted within the gap 90 and the welding system is actuated to cause electrode 58 to move into an abutting relationship with the surface of one workpiece to, in turn, apply a predetermined force or compressive pressure against the two workpieces. As this occurs, weld current is caused to flow from one electrode to the other to evoke a coalescence of the work pieces or parts within a localized region generally defined by the contact surfaces 60 and 84. That coalesced region generally is referred to as a "nugget". Electrode 58 then is elevated to release the thus joined workpieces. In the course of this welding procedure, welding current is caused to flow from the transforming secondary side along directionally altering paths, for example, defined by regions such as described at 46–48 and 72 and 73, as well as along the weld path region represented by the electrodes 58 and 82, as well as portions of their respective holders 54 and 78. One representation of the directionally altering input path thus developed is shown at arrows 92 and 93, while one representation of directionally altering return current paths is represented at arrows 94 and 95. Each of the regions of these current paths having a given directional aspect will evoke an electromagnetic field of corresponding directional orientation. Being of differing orientations and exhibiting substantial field strengths or intensities, these fields necessarily will mutually intercept about the location of measurement interest.

Mounted intermediate the electrode 58 and electrode holder 54 is a weld current measuring apparatus configured in accordance with the invention and shown generally at 100. The generally cylindrically shaped apparatus 100 is formed of an electrically conductive material such as a beryllium-copper alloy containing no significant ferrous materials such that the electromagnetic flux of the variously directionally generated fields may pass through it. Current measurement by the apparatus 100 is through the utilization of two or more Hall effect sensors or devices which are strategically arranged such that an accurate current measurement is achieved with respect to the weld path region of interest represented at portion 102 of arrow 93. The Hall effect sensor based current sensing circuit, for the instant embodiment, is incorporated in combination with a load cell-based force measuring device marketed under the trade designation WT9000 marketed by Sensotec, Incorporated of Columbus Ohio. Outputs from this apparatus 100 are conveyed to signal treatment and analysis systems by cabling a portion of which is shown at 104.

Figure 2:
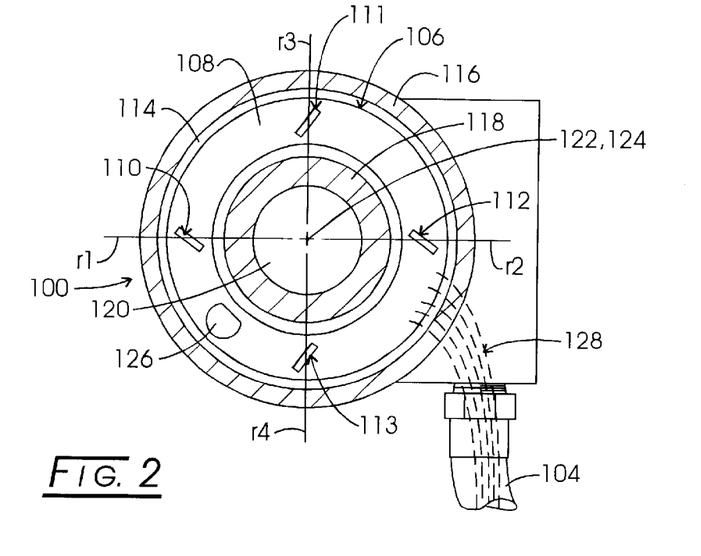
FIG. 2 is a sectional view taken through the plane 2—2 in FIG. 1.

Particularly where the very high currents of the resistance type welding systems are involved with correspondingly strong electromagnetic fields, single Hall effect sensor based current sensors have exhibited a deleterious position sensitivity occasioned by the noted intersecting electromagnetic fields. This position sensitivity is avoided with the instant apparatus through a strategic positioning and number of Hall effect sensors. Referring to FIG. 2, a cross-section of the apparatus 100 permitting a view looking generally downwardly toward an annulus-shaped circuit board 106 is provided. Circuit board 106 has a flat mounting surface 108 upon which four upstanding Hall effect sensors 110–113 are mounted. Circuit board 106 is mounted within a cavity 114 having a cylindrical outer wall 116, as well as an electrically conductive cylindrically shaped inner conduit 118. Conduit 118 has an opening or channel 120 passing therethrough functioning to convey the earlier-described water coolant. The Hall effect sensors or devices 110–113 are of a generally rectangular configuration and may be provided as a programmable linear Hall effect sensor integrated circuit fabricated utilizing silicon-CMOS technology. One predetermined face of each of the devices 110–113 will produce a sensor output signal of a first polarity in response to that electromagnetic flux which it confronts. Correspondingly, the face of the sensors 110–113 opposite such first face will produce a sensor output signal of second polarity opposite that first polarity in response to electromagnetic flux which it confronts. In general, the sensors are preprogrammed, including a programming of the sensitivity or gain thereof. An advantage of utilizing the Hall effect sensors as at 110–113 resides in their ability to measure current not only of an a.c. or pulsating variety, but also of a d.c. variety as may be found in some welding installations Devices 110–113 are mounted such that their faces are within or in parallel with a plane perpendicular to the plane represented by mounting surface 108. The housing of apparatus 100 may be considered to have a central location 122 which is coincident with a centrally disposed axis 124 passing therethrough and revealed in FIG. 3. The central location 122 is positioned generally coincident with the center or path axis of the current path passing therethrough. In this regard, the principal current path is through the cylindrical inner conduit wall 118, however, current also will pass through the cylindrical outer wall 116. Such dual paths will have no adverse effect with respect to the weld current measurements made by apparatus 100. Circuit board 106 with associated Hall effect sensors is positioned within a peripheral region represented at cavity 114 which is located outwardly from the center location 122. Note that the Hall effect devices 110–113 additionally are radially symmetrically disposed about the center location 122. In this regard, note that Hall effect device 110 is positioned with respect to a radius r1 passing through its center. Diametrically oppositely disposed from Hall effect sensor device 110 is Hall effect sensor device 112 which is symmetrically disposed about radius r2 extending from central location 122. Radii r1 and r2 also establish or combine to define a diameter. In similar fashion, Hall effect sensor 111 is positioned along a radius r3 extending from central location 122 and, diametrically oppositely disposed therefrom, Hall effect sensor 113 is disposed about radius r4. Radii r3 and r4 combine to form or define a diameter. With the embodiment shown, the Hall effect sensors 110–113 are seen to be mutually angularly oriented at 90° radial spacing to develop their position symmetry about central location 122. Note, additionally, that each of the Hall effect sensors 110–112 is angularly oriented with respect to an associated respective radius r1–r4. The extent of this off-radius angular orientation is selected as a gain adjustment or attenuation feature.

A temperature sensing device 126 also is mounted upon circuit board 106. The outputs from the components 110–113 and 126, as well as any load cell derived weld force signals and inputs are provided at leads represented generally at 128 extending to cable 104.

Figure 3:
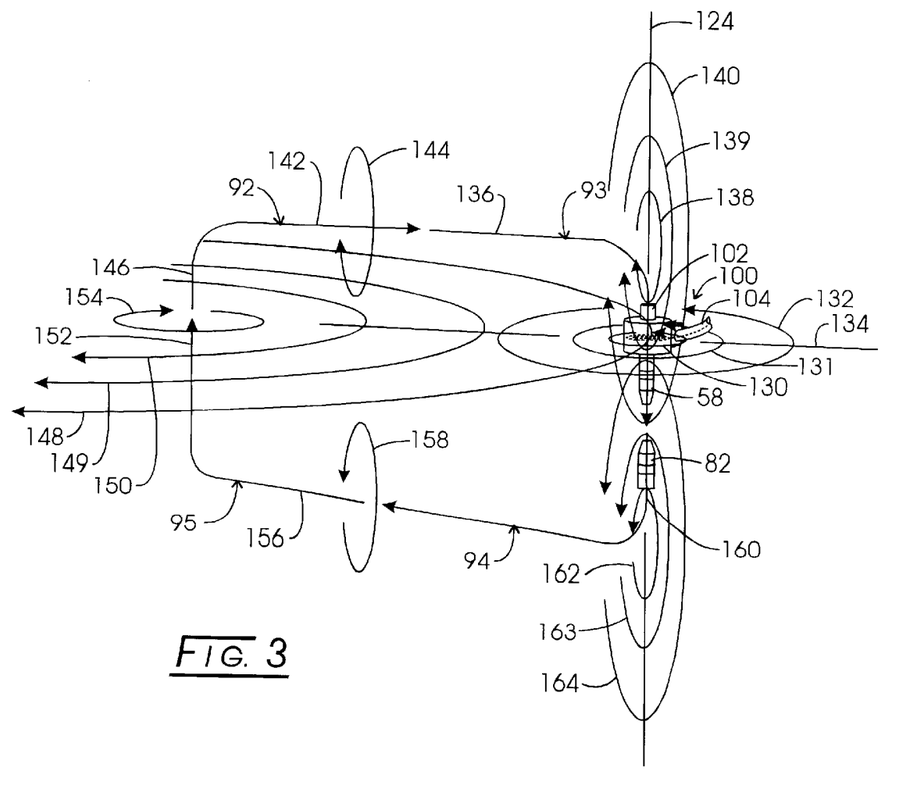
FIG. 3 is a perspective schematic representation of the electrodes shown in FIG. 1 and various electromagnetic field flux paths associated with currents generated within the welding machine of FIG. 1.

Referring to FIG. 3, a representation of certain of the electromagnetic fields associated with current path regions are illustrated in perspective fashion. Electrodes 58 and 82 are reproduced, as is current sensing apparatus 100. That apparatus is seen to be symmetrically disposed about axis 124, the central location 122 being coincident with axis 124. Thus, the Hall effect sensors 110–113 are disposed at a peripheral region within the housing of the sensor, such region being spaced radially outwardly from the axis 124. The weld current to be measured with the present arrangement is that within current path region 102, the direction or current path axis of which is coincident with axis 124. That current path component will develop an electromagnetic field extending perpendicularly or normally to axis 124 and represented, inter alia, by field lines 130–132. The mounting surface 108 of circuit board 106 will reside within a plane represented at 134 which is perpendicular to the axis 124. Current path arrows 92–95 are reproduced in the figure and, in this regard, it may be observed that current path region 136, represented at arrow 93, will generate an electromagnetic field represented, inter alia, by field lines 138–140. Similarly, current path region 142 at arrow 92 will generate an electromagnetic field represented, inter alia, by field line 144, while current within current path region 146 will generate an electromagnetic field represented, inter alia, by field lines 148–150.

Return current flowing within current path region 152 of arrow 95 will establish an electromagnetic field represented, inter alia, by field line 154, while return current within current path region 156, representing a portion of arrow 95, will develop an electromagnetic field represented, inter alia, by field line 158. Return weld current passing through current path region 160 at arrow 94 will develop an electromagnetic field which may be represented, inter alia, by field lines 162–164. As is apparent, all of these field lines will in one form or another pass through the current sensing apparatus 100 and the Hall effect sensor devices 110–113 contained therein.

Figure 4:
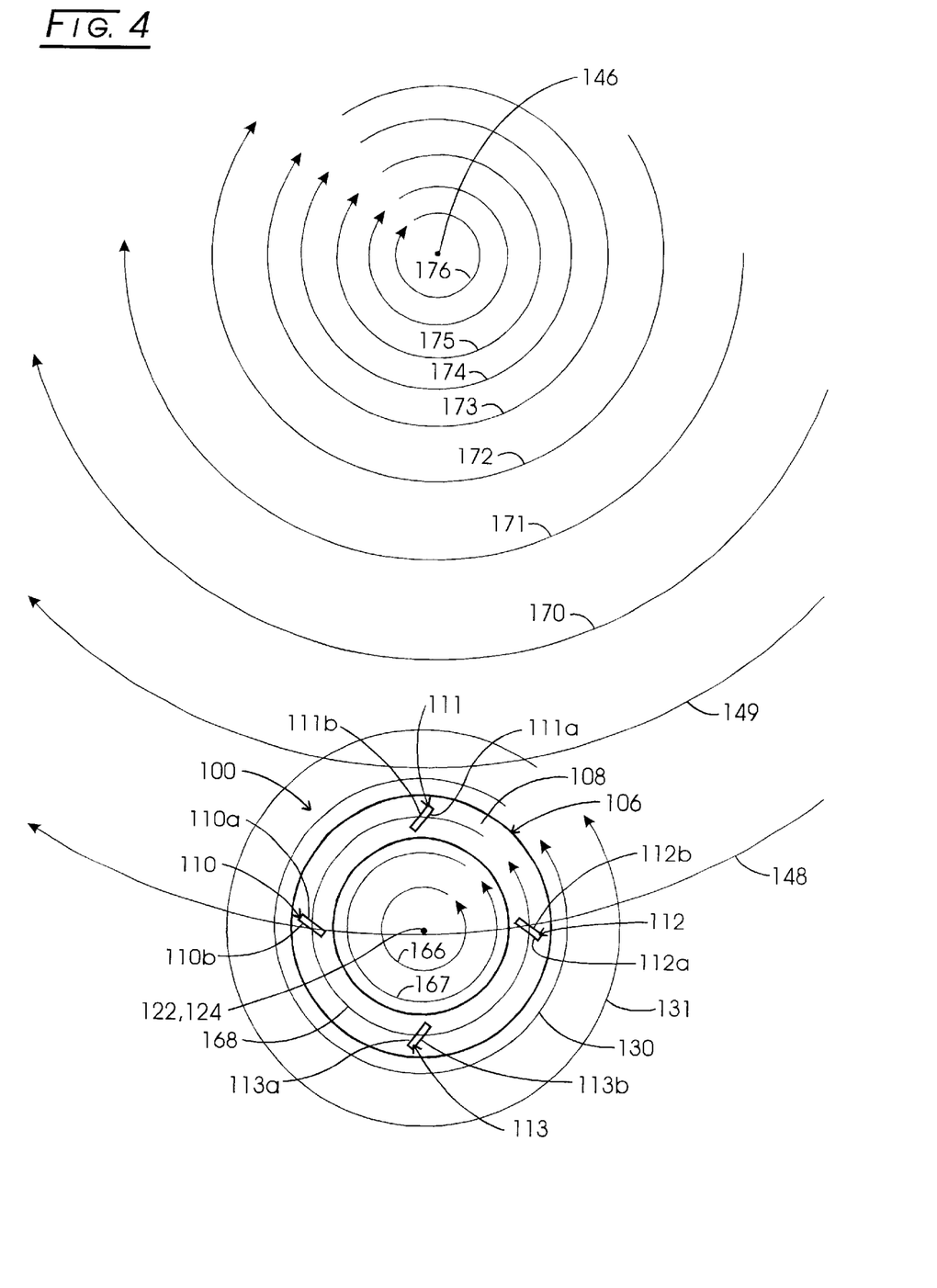
FIG. 4 is a schematic view showing the Hall effect sensor based apparatus of FIG. 1 in conjunction with generally horizontally oriented electromagnetic field flux lines.

By providing at least two Hall effect sensing devices the above-noted orientations wherein a common polar output deriving face of each confronts the electromagnetic flux within the current path sought to be measured, and wherein those Hall effect sensor devices are radially symmetrically disposed about the housing center location 122, the outputs of all sensors may be electrically summed and the result will be a cancellation of signals generated by all electromagnetic fields other than that electromagnetic field corresponding with the current path within which current is to be sensed. Referring to FIG. 4, this cancellation form of mounting geometry is schematically portrayed. In the figure, Hall effect sensors 110–113 are reproduced in conjunction with circuit board 106 and mounting surface 108. The mounting surface 108 will be coplanar with the earlier described plane 134 which is perpendicular to the axis 124 which, in turn, is coincident with the center location 122. Lines of electromagnetic flux emanating from the current path 102 to within which input current is sought to be measured again are reproduced with the numeration 130 and 131 and, additionally, by field lines 166–168. Additionally shown in the figure are the electromagnetic flux lines emanating from input path region 146, the position of which is represented with the same numeration. Input path region 146 has been described as generating an electromagnetic field, as represented, inter alia, at field lines 148–150. Of these, field lines 148 and 149 reappear in the instant figure in conjunction with corresponding additional field lines representing electromagnetic field from current path region 146 and identified at 170–176.

That face of each Hall effect sensor 110–113 which confronts the electromagnetic field generated at weld path region 102 to develop a sensor output signal of a first or common polarity is represented respectively at 110a–113a. Note that these faces 110a–113a, commonly confront field line 168. However, any extraneous electromagnetic field, or an electromagnetic field from which a current within a current path is not to be sensed, will self cancel. In this regard, note that field line 148 evoked from current passing within current path region 146 will pass through face 112b of Hall effect sensor 112 and through face 110a of Hall effect sensor 100. Hall effect sensor 112 will generate an output signal of polarity opposite that generated by Hall effect sensor 110 with respect to flux lines as at 148. This same cancellation effect obtains with any other oriented electromagnetic fields except that field within the weld current path sought to be measured. Thus, by summing the outputs of all of the Hall effect sensor devices 110–113, the effect otherwise imposed by these extraneous magnetic fields is cancelled and the resultant signal will be linearly proportional to the current sought to be measured, albeit exhibiting a given multiplying factor representing the number the Hall sensors involved and their respective gains.

Figure 5:
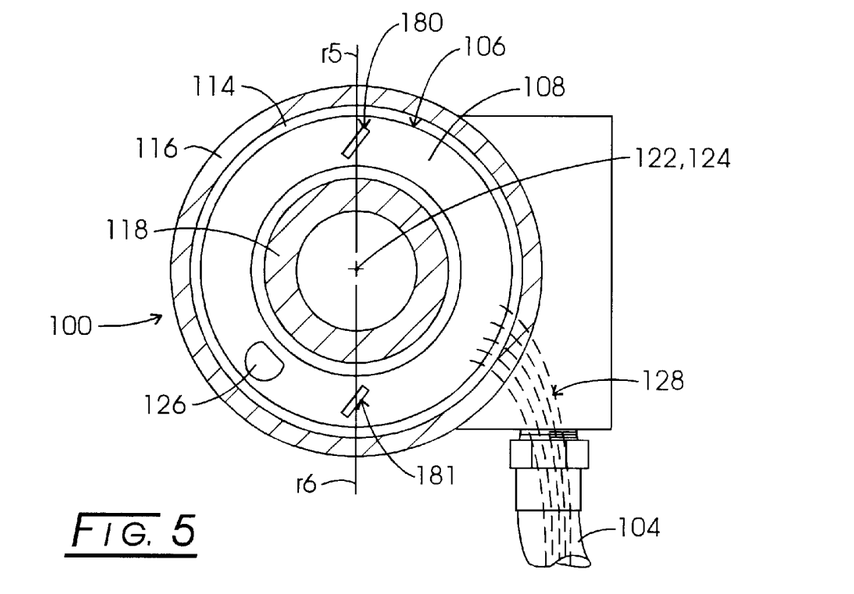
FIG. 5 is a sectional view similar to FIG. 2 but showing an implementation of the invention with two Hall effect sensors.

Referring to FIG. 5, device 100 and associated circuit board 106 again are represented in cross sectional fashion but with the minimum number of two Hall effect sensor devices at its peripheral region. These devices are represented in the figure at 180 and 181. As before, it is necessary that the sensors be positioned radially symmetrically disposed about the housing center location 122. In this regard, Hall effect sensor device 180 is positioned along radius r5, while symmetrically disposed Hall effect sensor device 181 is disposed along radius r6. Radii r5 and r6 represent or define a diameter extending through the center location 122.

Figure 6:
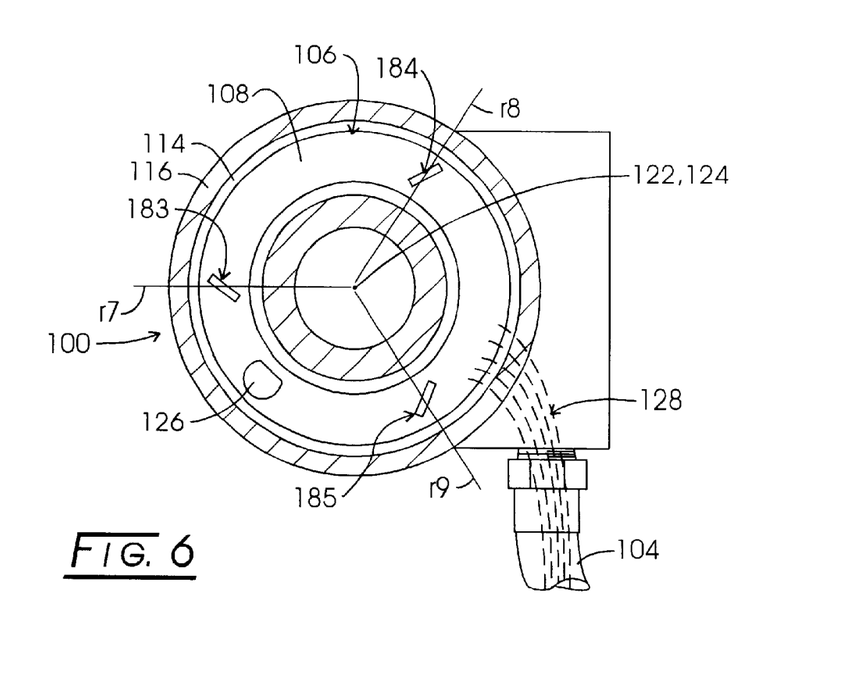
FIG. 6 is a sectional view similar to FIG. 2 but showing configuration of the invention employing three Hall effect sensors.

Referring to FIG. 6, apparatus 100 is reproduced in conjunction with three Hall effect sensor devices 183–185. Hall effect sensing device 183 is seen to be disposed along radius r7, while Hall effect sensing device 184 is disposed along radius r8, and Hall effect sensing device 185 is disposed along radius r9. Those radii r7–r9 extend from central location 122 and are mutually angularly oriented at a 120° radial spacing. As before, the sensors 183–185 are equally angularly oriented with respect to respective radii r7–r9 to selectively diminish the amount of confronting face area receiving the desired electromagnetic flux corresponding with current within the weld current path of interest.

With the radiantly symmetrically disposed orientation of the Hall effect sensing devices as represented in FIGS. 2, 5 and 6, upon summing the outputs of those sensors, the effects of extraneously generated or remotely generated electromagnetic fields will be cancelled.

Figure 7:
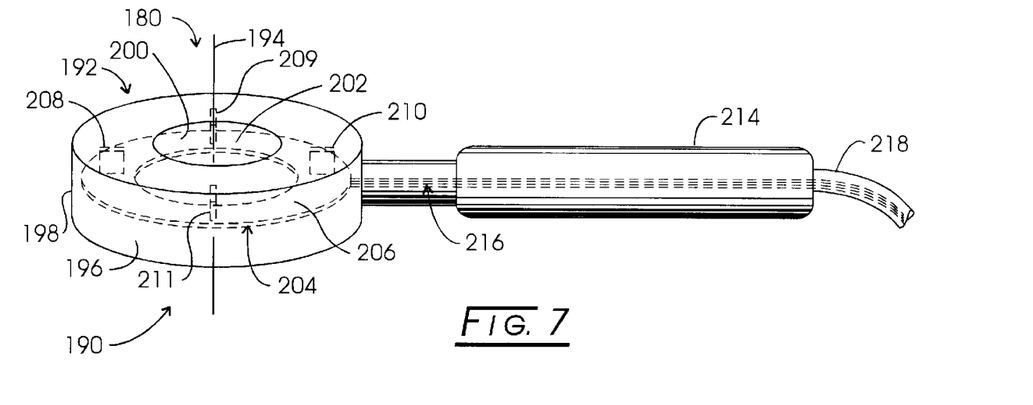
FIG. 7 is a perspective view of a portable, hand graspable measuring apparatus according to the invention.

Because of the position sensitive immunity of the weld current sensors according to the invention, advantageously they may be fashioned in portable configurations. Referring to FIG. 7, a portable weld current measuring apparatus is represented generally at 190. Apparatus 190 includes a housing represented generally at 192. Housing 192 is formed generally as a right cylinder having a center location represented at axis 194 extending through what may be considered the center of the cylindrical shape. Spaced radially outwardly from the center location 194 is a peripheral region 196 located between the outer housing surface 198 and an inner cylindrical surface 200. Inner cylindrical surface 200 defines a central opening 202 which is symmetrically disposed about the central axis and central location 194. In general, the opening 202 will have a radial or diametric extent selected such that it may be slid upwardly over an electrode, for example, as at 58 (FIG. 1). Of course, it may be slid over other current path regions having a current flow which the user wishes to measure. Shown in phantom within the housing 192 outer peripheral region 196 is an annular circuit board 204 having an upwardly disposed mounting surface 206. Mounted perpendicularly to the surface 206 are four Hall effect sensing devices 208–211. As before, devices 208–211 are radially symmetrically disposed about the central axis or center location 194 of the housing. Additionally, it may be observed that, for this embodiment, devices 208–211 are shown oriented such that their oppositely disposed faces will be aligned with radii extending from central axis 194. Thus, their faces confronting flux emanating from a current sought to be measured will evoke a sensing output representing the full area of confrontation with such flux. Housing 192 is hand supported from a hand grippable handle 214. Electrical leads shown generally at 216 are seen to extend to a cable 218. Apparatus 190 is formed of a material permitting the passage of electromagnetic flux therethrough. For example, it may be formed of an acrylic, methylmethacrylate, a polyvinyl acetate, polyolefins and like suitable polymeric materials.

Figure 8:
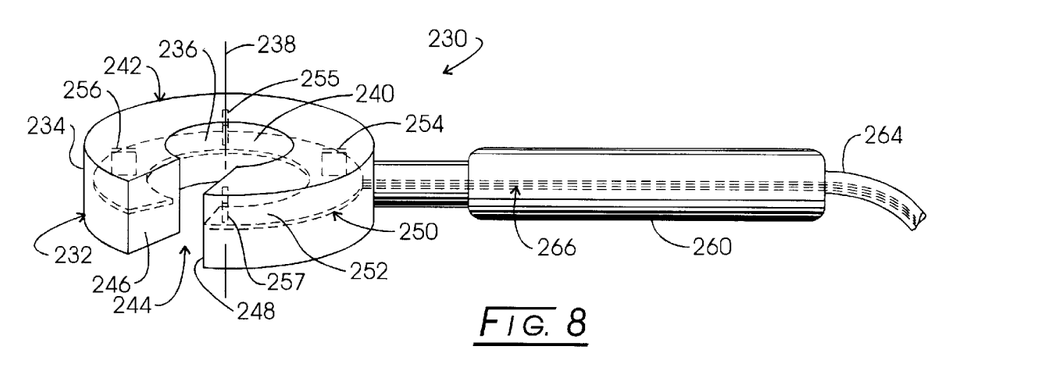
FIG. 8 is a perspective view of the sensor of FIG. 7 but with the inclusion of an open path access slot extending through the peripheral region thereof.

Referring to FIG. 8, an adaptation of the weld current sensing apparatus 190 is shown in general at 230. Apparatus 230 includes a housing represented generally at 232 having a right cylindrical configuration with an outer surface 234 and an inner cylindrically shaped surface symmetrically disposed about a central axis 238 representing a central location.

Inner surface 236 defines a central opening 240 and the region intermediate outer surface 234 and surface 236 defines a peripheral region represented generally at 242. Note, that housing peripheral region 242 is not continuous and is configured having a trapezoidally shaped open path access slot 244 defined between radially disposed end surfaces 246 and 248. Slot 244 permits the housing 232 to be maneuvered over a current carrying conduit having no exposed endpoint such as an electrode. Housing 232 supports a generally annular shaped circuit board 250 which is broken away or interrupted at end surfaces 246 and 248. The mounting surface 252 of circuit board 250 is arranged perpendicularly to the axis 238 and supports perpendicularly oriented Hall effect sensing devices 254–257. As before, these devices 254–257 are radially symmetrically disposed about the housing center location at axis 238. At the option of the designer, the gain evidenced by these devices 254–257 may be adjusted by equally radially and angularly offsetting them a predetermined amount. In similar fashion as the instrument 190, the apparatus or instrument 230 incorporates a handle 260 through which electrical leads represented generally at 262, stem from the circuit board 250 and, thence into a flexible cable 264. The housing 232 and handle 260 of apparatus 230 may be formed with an appropriate polymer as described above in connection with apparatus 190 and FIG. 7.

Figure 9:
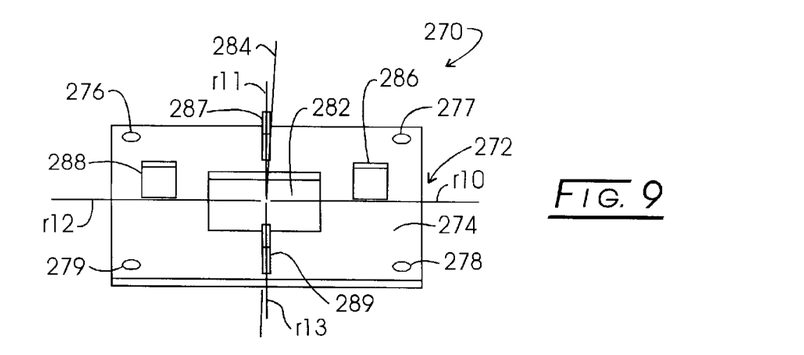
FIG. 9 is a perspective view of apparatus according to the invention but showing a housing implemented as a circuit board.

The current sensing apparatus of the invention may be permanently mounted within a welding apparatus and thus, may assume a variety of configurations which do not involved an elaborate housing. Referring to FIG. 9, an implementation of the apparatus wherein a simple housing is provided essentially as a circuit board is represented generally at 270. The apparatus 270 includes a circuit board 272 having a mounting surface 274 and four mounting holes or apertures 276–279 through which suitable fasteners may be inserted. A central opening 282 having a rectangular periphery is formed within the circuit board (housing) 272 and extends about a central location or axis 284. Four Hall effect sensing devices 286–289 are mounted perpendicularly to the mounting surface 274 and are radially symmetrically disposed about the central location or axis 284. In this regard, Hall effect sensing device 286 is radially aligned with radius r10 extending from central location 284; device 287 is aligned with radius r11; device 288 is aligned with radius r12; and device 289 is aligned with radius r13. As before, these sensor devices 286–289 may be angularly oriented with respect to their associated radius to adjust gain characteristics.

Figures 10, 11:
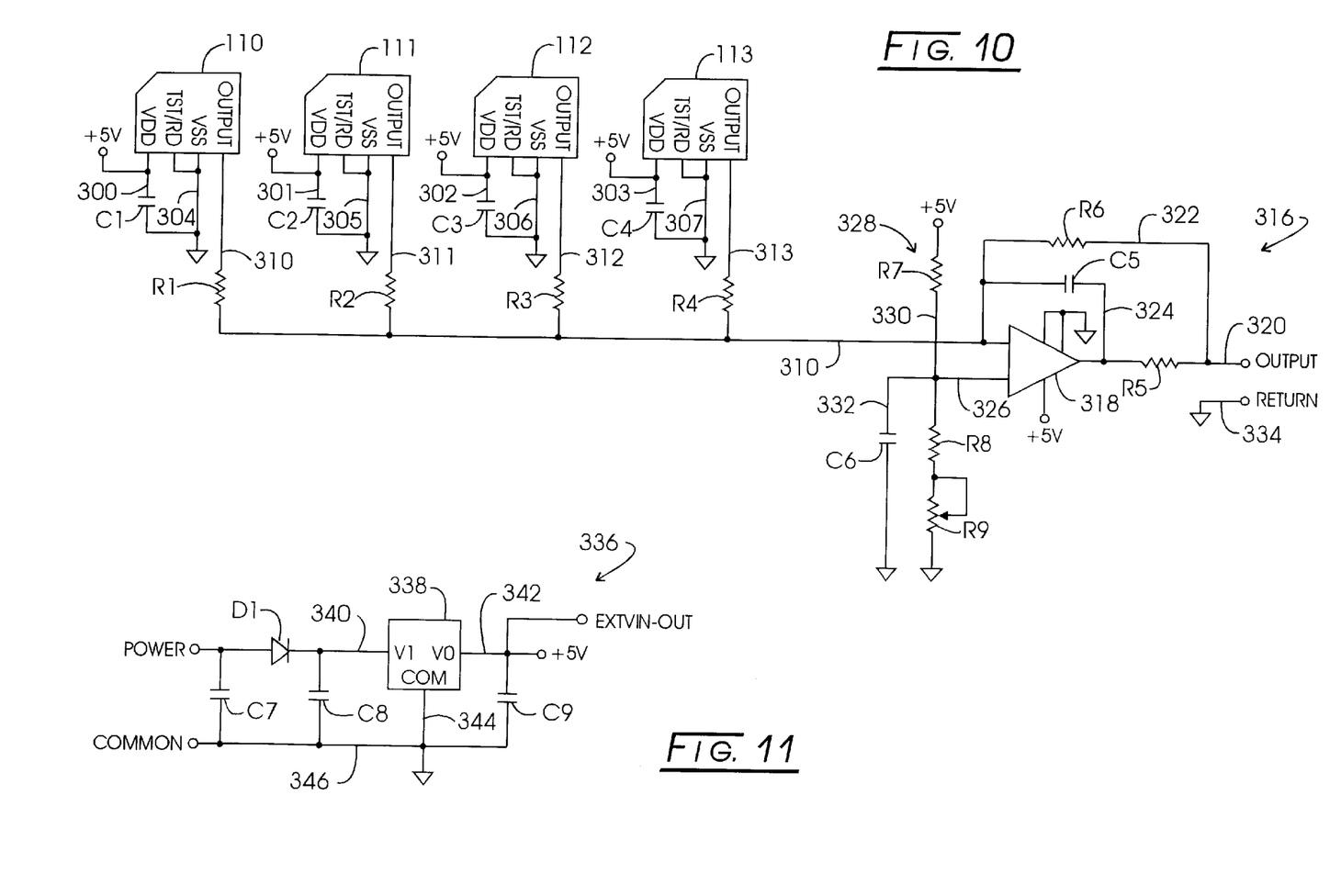
FIG. 10 is an electrical schematic drawing of four Hall effect sensors in combination with a summing network.
FIG. 11 is an electrical schematic diagram of a power supply utilized with the circuit of FIG. 10.

Referring to FIG. 10, an electrical schematic diagram is provided illustrating the circuit implementation of Hall effect sensing devices 110–113 in conjunction with the summing network component of a signal treatment circuit. In the figure, the Hall effect sensing devices are represented with the noted numeration. The supply inputs (VDD) of devices 110–113 are provided with a regulated +5 volt supply at respective lines 300–303. Lines 300–303 incorporate respective capacitors C1–C4, one side of each of which is coupled to ground through respective lines 304–307. The latter line grouping is, in turn, coupled to the ground (VSS) and test/read back enable terminals (TST/RD) of the devices. The outputs of Hall effect sensor devices 110–113 are provided at respective lines 310–313 incorporating respective resistors R1–R4. A combined output of devices 110–113 as presented at line 310 is introduced to a summing network represented generally at 316. Network 316 is comprised of an operational amplifier 318 having an output at line 320 and configured in conjunction with resistors R5 at line 320, R6 within feedback line 322 and capacitor C5 within line 324 to provide a summing function. Line 310, carrying the outputs of devices 110–113, is coupled with the negative input terminal of amplifier 318, while the positive terminal thereof is coupled via line 326 to a divider network represented generally at 328 and comprised of line 330 incorporating resistors R7–R9 and connected between +5V supply and ground. Resistor R9 is a potentiometer providing a trimming capability. A filter capacitor C6 is coupled within line 332 extending between line 330 and ground. Return is represented at line 334.

With the arrangement shown, the network 316 is provided with, for example, a 2.5 volt reference or virtual ground which is either reduced or elevated in value depending upon the instantaneous polarity of the signal present at line 310. The resultant measuring output signal at line 320 linearly corresponds with the current extant at the weld path region, for example, as described at 102 in FIG. 1. The value of the signal will be increased by a factor corresponding with the number of Hall effect sensor devices employed. For the present demonstration, that factor will be four. All signals representing intersecting accompanying fields impinging upon the devices 110–113 will have been cancelled. The circuitry of FIG. 10 preferably is placed upon the current sensing apparatus itself and, more particularly on the circuit board as at 106. In general, the gain programmed into devices 110–113 is set at a low level in view of the relatively high magnitude of electromagnetic fields involved in a resistance welding environment. Further attenuation is provided by the above-noted angular orientation of the confronting faces of the device with respect to the radius with which they are otherwise aligned. As noted above, the circuit may be combined with a force measuring instrument as described in connection with FIGS. 1 and 2. One such force measuring device is described in U.S. Pat. No. 5,504,299 (supra) incorporated herein by reference.

Also mounted upon the apparatus circuit board as described earlier herein at 106 is a power supply providing the noted regulated +5V output. In FIG. 11, the power supply network is represented in general at 336 and is centered about a type LT11211ST regulating device 338. Power is supplied from an external cable to the device 338 from line 340 incorporating a steering diode D1. Regulated output from device 338 is provided at line 342. The common terminal of device 338 is coupled to ground via line 344 and the device is configured with filtering capacitors C7–C9 coupled between lines 340 and 342 and ground as represented at line 346.

The analog measuring output signal evolved at line 320 may be treated in a variety of ways representing both measurement and analysis. In general, where it is of an a.c. nature, a root mean square (RMS) operation is carried out, generally following digitization of the analog signal.

Figure 12:
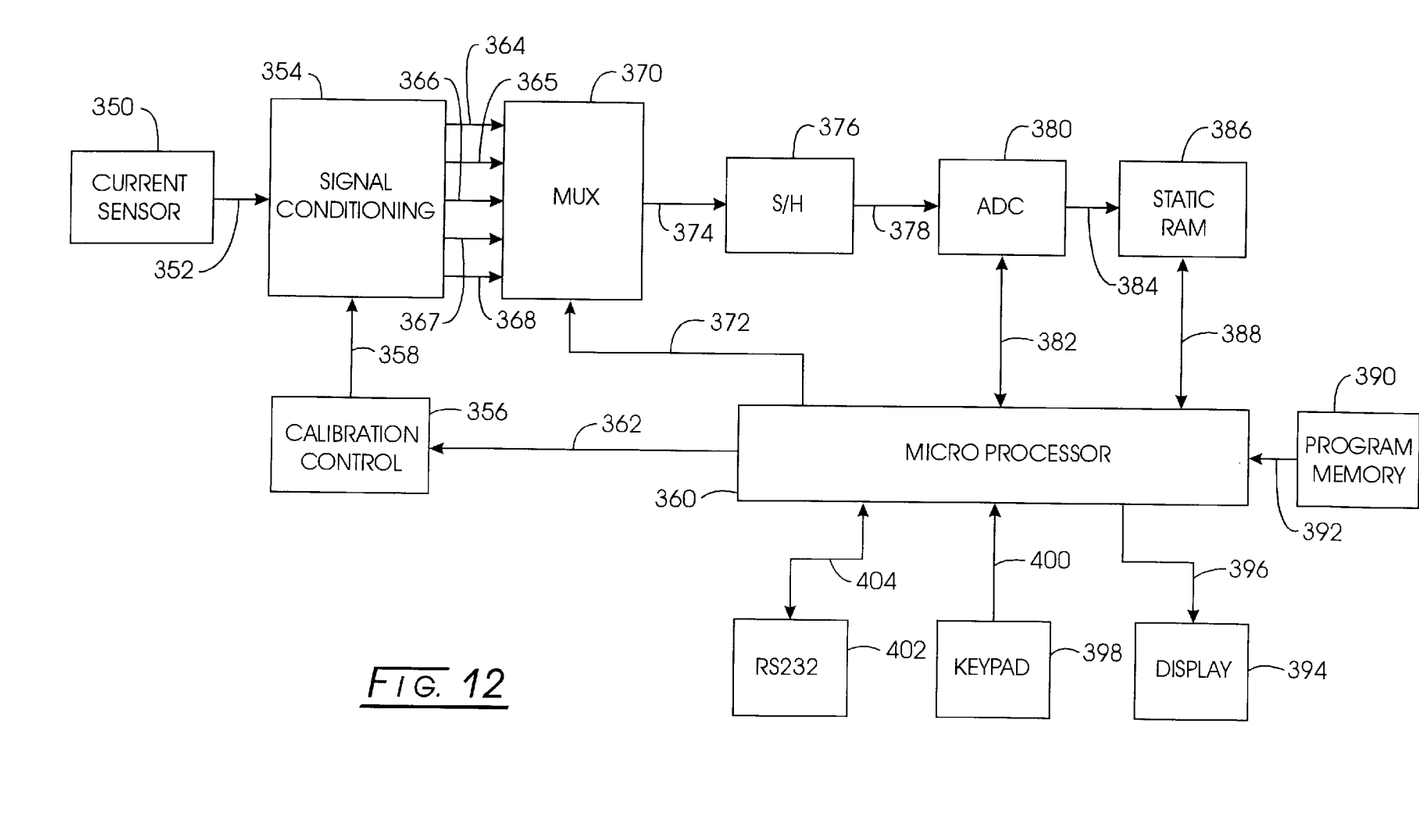
FIG. 12 is a block diagram of a signal treatment circuit and system which may be employed with the current sensor of the invention.

Referring to FIG. 12, a block diagram of a signal treatment and output arrangement which may be utilized with the measuring output signal is portrayed. The current sensing function is represented at block 350 as providing the noted (summation) measuring output signal at arrow 352. That analog signal is introduced to a signal conditioning network represented at block 354. Network 354 performs in conjunction with a calibration control function as represented by block 356 and arrow 358. Control 356, in turn, is under the control of a microprocessor function represented at block 360, such control being represented at arrow 362. The signal conditioning function at block 354 carries out signal ranging to accommodate the analog signal to the corresponding voltage range of an analog-to-digital function carrying out, inter alia, a sampling operation. Additionally, zero and reference offset measurements can be made to provide correction factors for later use by the microprocessor 360. Thus, ranged signals, for example, categorized as high, intermediate and low can be provided from the signal conditioning function at block 354 as represented by the three arrows 364–366. Zero offset outputs are provided at arrow 367 and a reference test output is provided, for example, at arrow 368. These outputs are selected by a multiplexing function represented at block 370 which, as represented by arrow 372 is under the control of the microprocessor function 360. The output of multiplexing function 370 is directed, as represented at arrow 374, to a sample and hold network represented at block 376. That sample and hold network then is accessed in sampling fashion by an analog-to-digital converter as represented by arrow 378 and block 380. Converter 380 is interactively associated with the microprocessor function 360 as represented by dual arrow 382. Sampling frequencies at the converter 380 are selected under the Nyquist criterion. Resultant digitized samples then, as represented at arrow 384 and block 386, are submitted to static random access memory (RAM) which is controlled and accessed by the microprocessor function 360 as represented by dual arrow 388.

Microprocessor function 360 performs in conjunction with conventional program memory as represented at block 390 and arrow 392 and provides an output, for example, at a display or printer as represented at block 394 and arrow 396. The operator may input data such as operating ranges, frequencies, numbers of cycles, input and output constants for calibration, expected current magnitudes, dates and the like. Such inputs are represented at keypad block 398 and arrow 400. Interactive communication also may be provided with a RS 232 bidirectional communications port as represented at block 402 and dual arrow 404.

Figure 13:
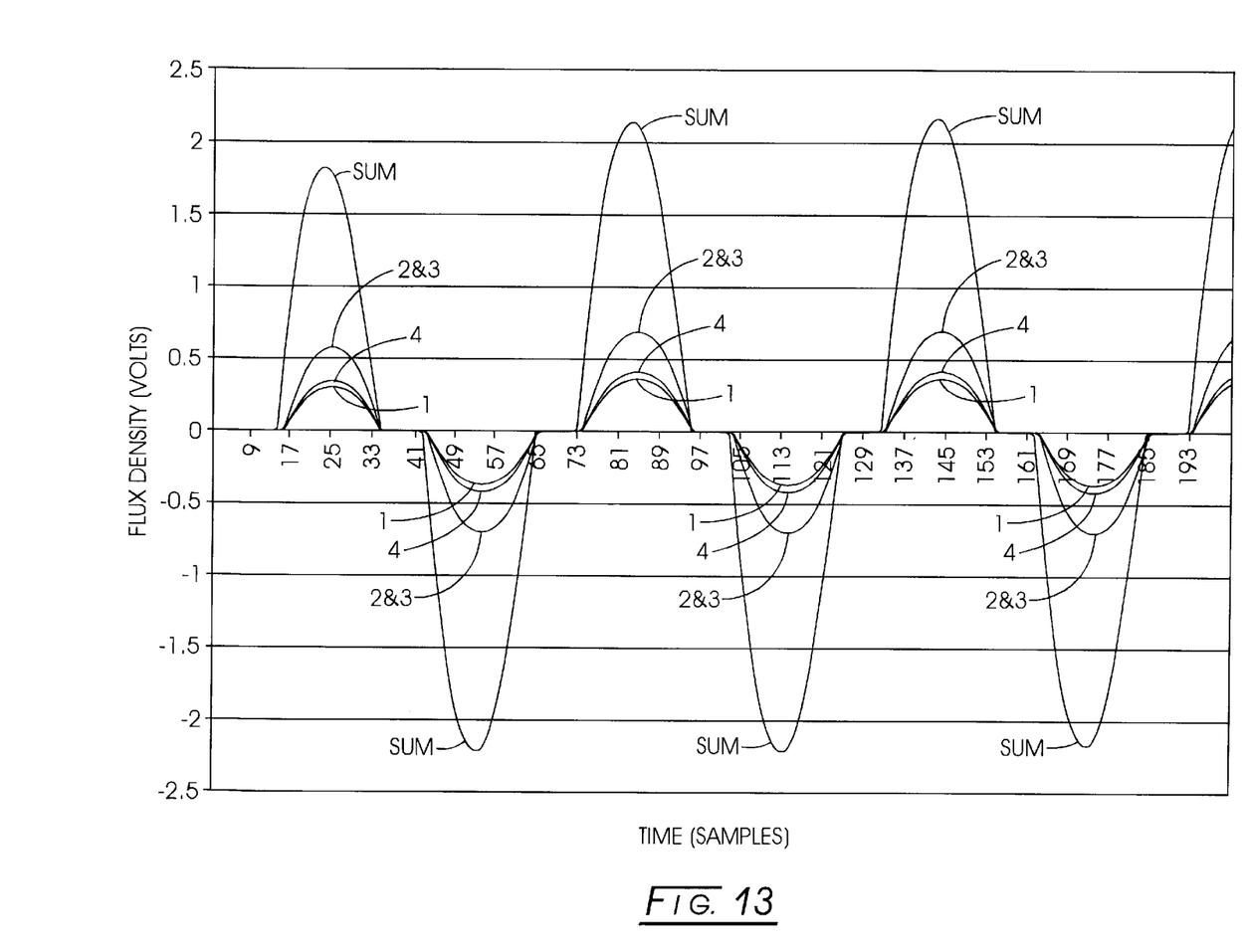
FIG. 13 is a graphical representation of the outputs of four Hall effect sensors and a summation curve corresponding therewith showing the output of a current sensor according to the invention at an arbitrary 45° orientation within a welding machine.
Figure 14:
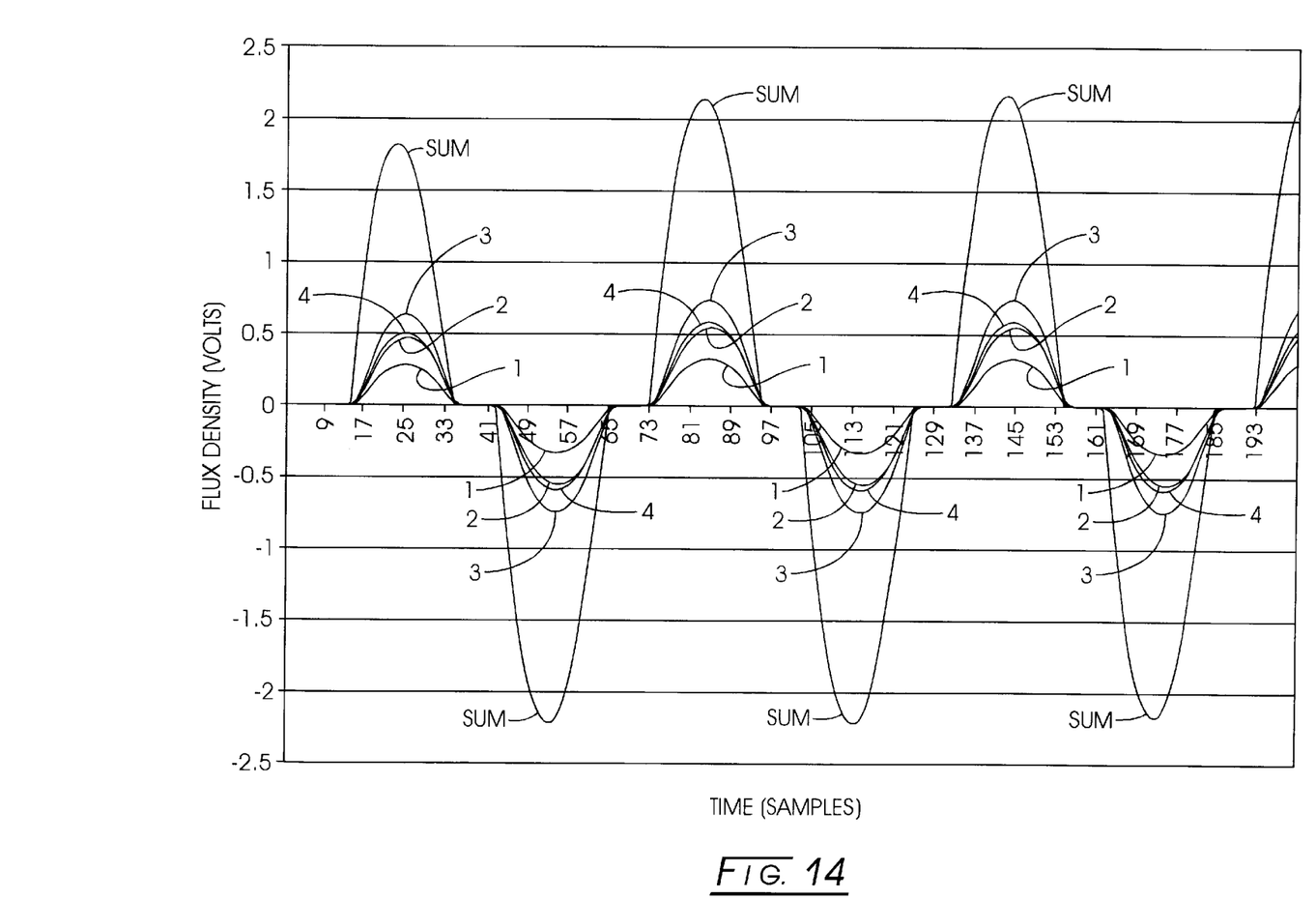
FIG. 14 is a corresponding graphic representation showing the outputs of the Hall effect sensors as represented in FIG. 13 but at a sensor apparatus orientation arbitrarily established at 90°.

Referring to FIGS. 13 and 14, a set of curves representing the individual discrete outputs of four Hall effect sensor devices, as well as a curve derived as a summation of those sensor outputs for repeated applications of weld current is portrayed. In this regard, a pedestal welding machine essentially identical to that described in connection with FIG. 1 was employed in conjunction with a current sensing apparatus identical to that described at 100 in connection with FIGS. 5 and 2. The Hall effect sensor devices were positioned upon a circuit board as shown at 106 in FIG. 2 and generally in the orientation shown at devices 110–113. A zero angular starting orientation was then arbitrarily elected for the positioning of the apparatus 100, whereupon it was rotated from that arbitrary zero orientation through 360° in 45° increments. At each increment, weld current was generated on the output of each discrete Hall effect sensor was recorded. The Hall effect sensors were numbered from one through four and their discrete output curves are labeled in the figures with that same numeration. Data from the discrete sensors was directed into a data acquisition system.

That system included a data acquisition card marketed by National Instruments Corp. and a corresponding software program marketed by National Instruments Corp. identified as "Lab View". The curves of FIG. 13 show flux density outputs in volts commencing with a first application of weld current through a sixth application of such current. The weld current applied for FIGS. 13 and 14 was 9000 amperes. The curves at FIG. 13 correspond with an orientation of the apparatus 100 rotated 45° from the arbitrary zero position. The curves at FIG. 14 show the same data, however, the apparatus 100 was rotated to a 90° displacement from the arbitrary zero position. The discrete outputs from the Hall effect sensor devices are labeled at 1 through 4 in correspondence with the identification of the devices. Comparing FIGS. 13 and 14, it may be observed that while the discrete outputs labeled 1 through 4 may vary significantly, their summation between the 45° orientation of FIG. 13 and the 90° orientation of FIG. 14 are at the same amplitude. The lower amplitude at the commencement of the test, as represented at the far left side of each of these plots corresponds with a startup characteristic of the welding machine wherein the operator elected weld current value has not been reached.

Since certain changes may be made in the above-described apparatus and method without departing from the scope of the invention herein involved, it is intended that all matter contained in the description thereof or shown in the accompanied drawings shall be interpreted as illustrative and not in a limiting sense.

What is claimed is:

1. In a welding system in which current is caused to flow from a source along a directionally altering input path region to a weld path region having an electrode located to effect a coalescence of work parts at a weld location, said current thence passing along a directionally altering return path region to said source, such current path regions directional alterations generating mutually intersecting electromagnetic fields of corresponding directional orientation, the improved weld current measuring apparatus, comprising:

a housing having a center location and a peripheral region spaced radially outwardly therefrom, positionable to locate said center location at a select said current path region with said peripheral region being in surrounding relationship thereto;

at least two Hall effect sensors, each having a first face responsive to a confronting electromagnetic field to cause said sensor to produce a sensor output signal of first polarity, and an oppositely disposed second face responsive to a confronting electromagnetic field to cause said sensor to produce a sensor output signal of second polarity opposite said first polarity, said sensors being supported upon said housing at said peripheral region in orientations effecting the confrontation of said first face with that said electromagnetic field generated at said select current path, and being radially symmetrically disposed about said housing center location; and a signal treatment circuit responsive to the sensor output signal of each said Hall effect sensor to effect a summation thereof deriving a measuring output signal corresponding with current flow at said select current path region unaffected by sensor output signals derived with respect to electromagnetic fields generated by current path regions without said select current path region.

2. The current measuring apparatus of claim 1 in which two said Hall effect sensors are mounted at said housing peripheral region which are mutually oppositely disposed along a diameter passing through said center location.

3. The current measuring apparatus of claim 1 in which three said Hall effect sensors are mounted at said housing peripheral region, each being positioned at one of three radii extending from said center location and mutually angularly oriented at 120° radial spacing.

4. The current measuring apparatus of claim 1 in which four said Hall effect sensors are mounted at said housing peripheral region, each being positioned at one of four radii extending from said center location and mutually angularly oriented at 90° radial spacing.

5. The current measuring apparatus of claim 1 in which:

said housing extends about a central axis coincident with said central location;

said housing peripheral region includes a mounting surface defining a plane perpendicular to said central axis; and said Hall effect sensors are mounted upon said mounting surface, said first and second faces thereof being oriented generally perpendicularly to said mounting surface.

6. The current measuring apparatus of claim 1 in which:

each said Hall effect sensor is located at a unique radius extending from said central location;

each said Hall effect sensor exhibits a given gain characteristic; and each said first face of each said Hall effect sensor is angularly oriented with respect to said unique radius a common angular extent selected to attenuate said given gain characteristic.

7. The current measuring apparatus of claim 1 in which:

each said Hall effect sensor exhibits a given gain characteristic; and each said first face of each said Hall effect sensor is angularly oriented an amount diminishing the area thereof available for confronting a said electromagnetic field, said amount being of an extent selected to attenuate said gain characteristic.

8. The current measuring apparatus of claim 1 in which:

said select current path region is said electrode containing weld path, said weld path extending along a weld path axis;

said housing is formed of electrically conductive material, extends about a central axis coincident with said central location, said peripheral region including a mounting surface defining a plane perpendicular to said central axis;

said Hall effect sensors are mounted such that said first and second faces thereof are oriented generally perpendicularly to said mounting surface; and said housing being mounted within said electrode containing weld path and forming a part thereof, said housing central axis being generally coincident with said weld path axis.

9. The current measuring apparatus of claim 1 in which:

said select current path region is said electrode containing weld path, said weld path extending along a weld path axis;

said housing extends about a central axis coincident with said central location, said peripheral region including a mounting surface defining a plane perpendicular to said central axis;

said Hall effect sensors are mounted at said housing peripheral region, said first and second faces thereof being oriented generally perpendicularly to said mounting surface; and said housing is configured with a central opening extending therethrough, formed generally symmetrically about said central axis and dimensioned to be movable over said electrode for positioning said peripheral region in juxtaposition with said weld path and said central axis being generally coincident with said weld path axis.

10. The current measuring apparatus of claim 9 in which said housing is configured having an open path access slot extending through said peripheral region and into access communication with said central opening.

11. The current measuring apparatus of claim 9 including a hand graspable handle fixed to and extending outwardly from said housing peripheral region.

12. In an electrical system wherein current is caused to flow along directionally altering conductive paths and is of a current level effecting the generation of electromagnetic fields having orientations which correspond with said directional conductive path alteration and which mutually intersect, apparatus for measuring the current flow value at a select said conductive path comprising:

a housing having a center location and a peripheral region spaced outwardly therefrom, said housing being configured for locating said center location in alignment with said select conductive path and said peripheral region in adjacency therewith;

at least two Hall effect sensors, each having a first face responsive to a confronting electromagnetic field to cause said sensor to produce an output signal of first polarity, and an oppositely disposed second face responsive to a confronting electromagnetic field to cause said sensor to produce a sensor output signal of second polarity opposite said first polarity, said sensors being supported at said housing peripheral region in orientations effecting the confrontation of said first face with that electromagnetic field generated at said select conductive path and being symmetrically disposed about said housing center location; and a signal treatment circuit responsive to the sensor output signal of each said Hall effect sensor to effect a summation thereof to derive a measuring output signal linearly corresponding with the value of current flow at said select conductive path.

13. The apparatus of claim 12 in which:

said housing extends about a central axis coincident with said central location;

said housing peripheral region includes a mounting surface defining a plane perpendicular to said central axis; and said Hall effect sensors are mounted upon said mounting surface, said first and second faces thereof being oriented generally perpendicularly to said mounting surface.

14. The apparatus of claim 12 in which:

each said Hall effect sensor is located at a unique radius extending from said central location;

each said Hall effect sensor exhibits a given gain characteristic; and each said first face of each said Hall effect sensor is angularly oriented with respect to said unique radius a common angular extent selected to attenuate said given gain characteristic.

15. The apparatus of claim 12 in which:

each said Hall effect sensor exhibits a given gain characteristic; and each said first face of each said Hall effect sensor is angularly oriented an amount diminishing the area thereof available for confronting a said electromagnetic field, said amount being of an extent selected to attenuate said gain characteristic.

16. The current measuring apparatus of claim 12 in which two said Hall effect sensors are mounted at said housing peripheral region which are mutually oppositely disposed along a diameter passing through said center location.

17. The current measuring apparatus of claim 12 in which three said Hall effect sensors are mounted at said housing peripheral region, each being positioned at one of three radii extending from said center location and mutually angularly oriented at 120° radial spacing.

18. The current measuring apparatus of claim 12 in which four said Hall effect sensors are mounted at said housing peripheral region, each being positioned at one of four radii extending from said center location and mutually angularly oriented at 90° radial spacing.

19. The apparatus of claim 12 in which:

said select conductive path extends along a path axis;

said housing is formed of non-ferrous electrically conductive material, extends about a central axis coincident with said central location, said peripheral region including a mounting surface defining a plane perpendicular to said central axis;

said Hall effect sensors are mounted upon said mounting surface and oriented such that said first and second faces are generally perpendicular thereto; and said housing being mounted within and forming a part of said select conductive path, said housing central axis being generally coincident with said path axis.

20. The apparatus of claim 12 in which:

said select conductive path extends along a path axis;

said housing extends about a control axis coincident with said central location, said peripheral region extending about a central opening extending outwardly from said central location and including a mounting surface defining a plane perpendicular to said central axis;

said Hall effect sensors are mounted upon said mounting surface said first and second faces extending outwardly therefrom and generally perpendicular thereto; and said housing being hand manipulatable to locate said select conductive path within said housing central opening wherein said central axis is generally coincident with said path axis.

21. The current measuring apparatus of claim 20 in which said housing is configured having an open path access slot extending through said peripheral region and into access communication with said central opening.

22. The current measuring apparatus of claim 21 including a hand graspable handle fixed to and extending outwardly from said housing peripheral region.

23. A method for measuring weld current in a resistive welding system wherein current is caused to flow from a source along a directionally altering input conductive path to a weld path having an electrode located to effect a coalescence of work parts at a weld location, said current thence passing along a directionally altering return conductive path to said source, said path directional alterations evoking mutually intersecting electromagnetic fields of corresponding directional orientation, said method comprising the steps of:

(a) providing a housing having a center location and a peripheral region spaced outwardly therefrom;

(b) providing at least two Hall effect sensors, each having a first face responsive to a confronting electromagnetic field effect to derivation of a sensor output signal of first polarity, and an oppositely disposed second face responsive to a confronting electromagnetic field to effect derivation of a sensor output signal of second polarity opposite said first polarity, said sensors being supported at said housing peripheral region in orientations effecting the confronting of said first face with the electromagnetic field generated by current within said weld path and being radially symmetrically disposed about said housing center location;

(c) positioning said housing to locate said housing central location within said weld path;

(d) summing said sensor output signals to derive a measuring output signal linearly corresponding with the value of current within said weld path; and (e) treating said measuring output signal to derive a current value output.

24. The method of claim 23 wherein said step (b) provision of at least two Hall effect sensors provides two said Hall effect sensors mounted at said housing peripheral region which are mutually oppositely disposed along a diameter passing through said center location.

25. The method of claim 23 in which said step (b) provision of at least two Hall effect sensors provides three said Hall effect sensors mounted at said housing peripheral region, each being positioned at one of three radii extending from said center location and mutually angularly oriented at 120° radial spacing.

26. The method of claim 23 in which said step (b) provision of at least two Hall effect sensors provides four said Hall effect sensors mounted at said housing peripheral region, each being positioned at one of four radii extending from said center location and mutually angularly oriented at 90° radial spacing.

27. The method of claim 23 in which said step (b) provision of at least two Hall effect sensors radially symmetrically disposed about said housing center location, locates each said Hall effect sensor at a unique radius extending from said central location, each said Hall effect sensor exhibiting a given gain characteristic, and wherein each said first face of each said Hall effect sensor is angularly oriented with respect to an associated said unique radius an amount diminishing the area thereof available for confronting said electromagnetic field, said amount being of an extent selected to attenuate said gain characteristic.

28. The method of claim 23 in which:

said step (a) provides a said housing formed of non-ferrous electrically conductive material; and said step (c) positions said housing to form a part of said weld path.

29. The method of claim 23 in which:

said welding system includes a return electrode compressibly engageable under an electrode force with said work parts and said electrode during passage of current along said weld path;

said step (a) provides a said housing formed of non-ferrous electrically conductive material and including a force sensing load cell responsive to compressive force applied to said housing to derive a force signal corresponding with said electrode force;

said step (c) positions said housing between said electrode and said return electrode; and said step (e) includes the step of treating said force signal to derive a force value output.

30. The method of claim 23 in which:

said step (a) provides a said housing which includes a central opening extending outwardly from said central location to said peripheral region; and said step (c) positions said housing such that said weld path passes through said central opening.

31. The method of claim 30 in which:

said step (a) provides a said housing which includes an open path access slot extending through said peripheral region and into access communication with said central opening; and said step (c) positions said housing by moving said access slot across said weld path.

* * * * *